US005564699A

United States Patent [19]

Lawrence et al.

[11] Patent Number: 5,564,699
[45] Date of Patent: Oct. 15, 1996

[54] SIDE AND GAP SEALED OIL RING

[75] Inventors: Keith E. Lawrence, Peoria; Tsu P. Shyu, Dunlap; Donald J. Waldman, Brimfield; Ross P. Wietharn, Peoria, all of Ill.

[73] Assignee: Caterpillar Inc., Peoria, Ill.

[21] Appl. No.: 388,968

[22] Filed: Feb. 15, 1995

[51] Int. Cl.$^6$ ........................................ F16J 9/24
[52] U.S. Cl. .................. 277/136; 277/140; 277/193; 277/197
[58] Field of Search ........................ 277/138, 139, 277/140, 141, 163, 193, 196, 197, 216, 221, 223, 136

[56] References Cited

U.S. PATENT DOCUMENTS

| | | | |
|---|---|---|---|
| 1,560,818 | 11/1925 | Houldsworth | 277/139 |
| 2,837,386 | 6/1958 | Mayfield | 277/139 |
| 3,628,800 | 12/1971 | Prasse | 277/140 |
| 4,011,030 | 3/1977 | Staebler et al. | 418/51 |
| 4,421,328 | 12/1983 | Thurston et al. | 277/216 |
| 4,473,232 | 9/1984 | Umeha et al. | 277/216 |
| 4,629,200 | 12/1986 | Ruddy | 277/216 |
| 4,767,123 | 8/1988 | Kiese | 277/139 |
| 5,251,915 | 10/1993 | Meernik | 277/138 |

FOREIGN PATENT DOCUMENTS 0544459  6/1993  European Pat. Off. .

OTHER PUBLICATIONS

"Study of Transient Oil Consumption of Automotive Engine", Paper No. 892110, T. Inoue et al., Toyota Motor Corp., pp. 59–65 (no date available).

*Primary Examiner*—Daniel G. DePumpo
*Attorney, Agent, or Firm*—Diana L. Charlton; Alan J. Hickman

[57] ABSTRACT

An oil control ring assembly having a sealing ring and a scraping is disposed within a groove in a piston. The scraping ring assembly has a scraping end portion and spaced apart ends defining a gap. The sealing ring has a sealing end portion and mated spaced apart radially stepped ends defining a stepped gap. The stepped gap on the sealing ring is offset from the gap on the scraping ring. A spring positioned between an inner wall of the groove and the scraping ring biases the scraping ring at a specified tension. An alignment wire maintains misalignment between the stepped gap and the gap.

2 Claims, 8 Drawing Sheets

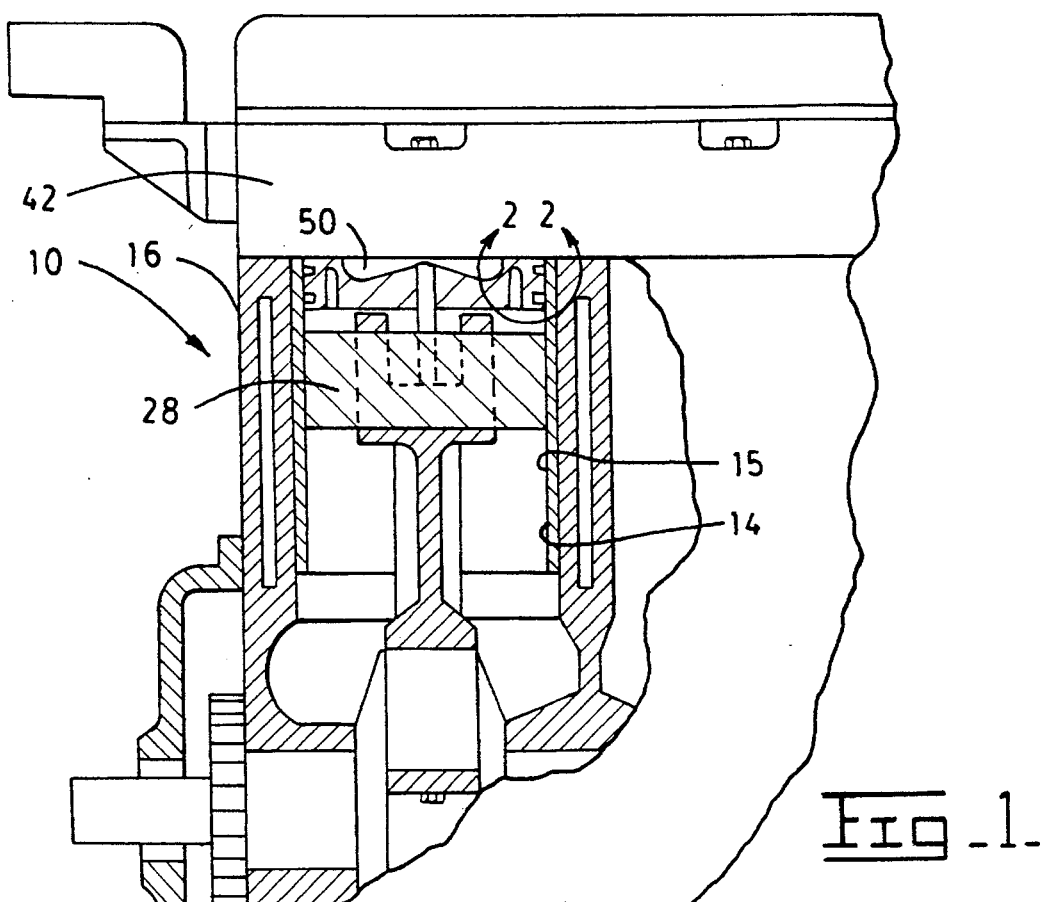
Fig_1_
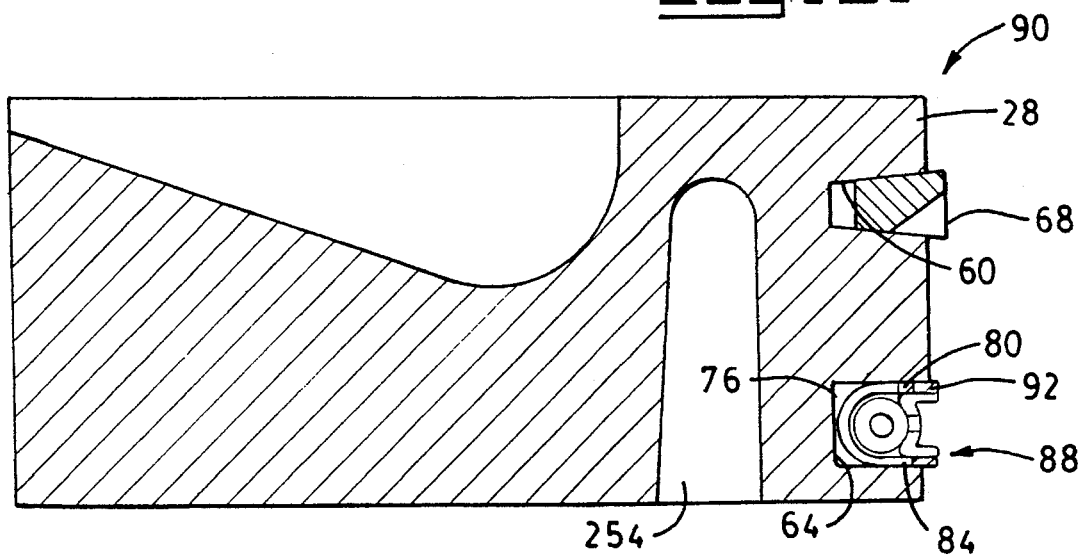
Fig_2_

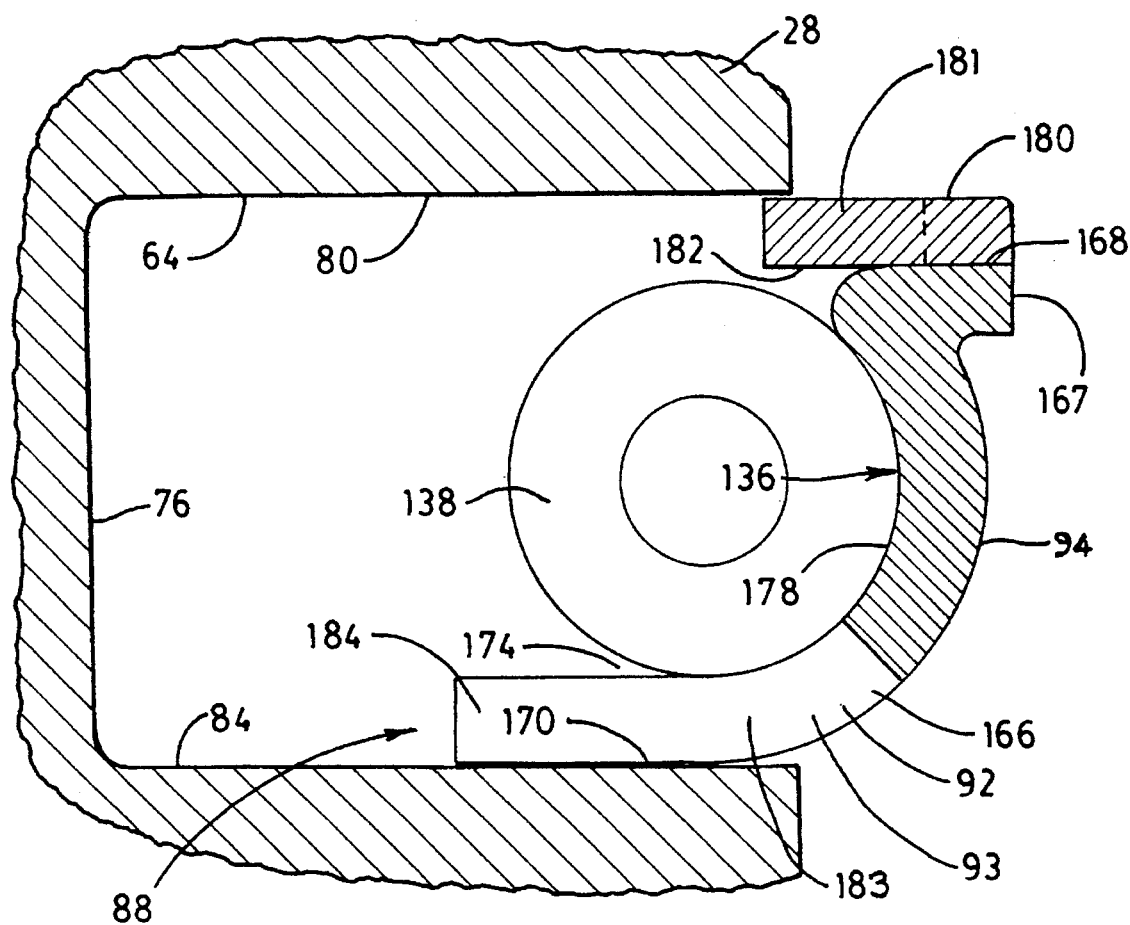
Fig_5_
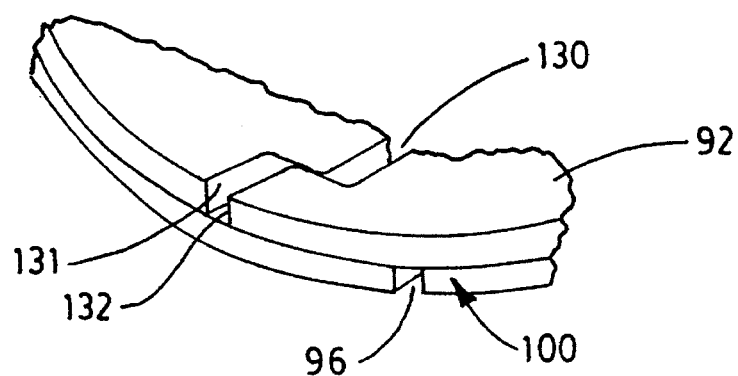
Fig_6_

5,564,699

SIDE AND GAP SEALED OIL RING

TECHNICAL FIELD

This invention relates generally to an oil ring for use on a piston within an internal combustion engine and more particularly to the combination gap and the side sealing of the oil ring within a groove of the piston.

BACKGROUND ART

Present day engines control oil leakage past a piston in the cylinder through the use of oil control rings in a groove of the piston. However, the oil rings have gapped ends which permit oil leakage, thus, increasing the oil consumption rate. Furthermore, oil leakage may also occur as the oil flows into the groove and out of the groove over the upper ring surface. The oil leakage, while increasing the oil consumption rate, further adversely affects the emissions of the engine whether the leaked oil is burned or remains unburned prior to entering the exhaust stream.

An oil control ring design is disclosed in U.S. Pat. No. 5,251,915 issued to Paul R. Meernik on Oct. 12, 1993 wherein the oil control ring is used for a piston and has a single low tension rail and a contiguous blocker ring, under light tension, to prevent oil flow through the rail end gap. A separator ring behind the blocker ring allows oil flow to a drainage vent to help keep the region behind the blocker ring dry. A dike behind the blocker ring in the form of a closed ring or a recess formed in the piston groove collects oil thrown upwardly on the upper half of the piston cycle to prevent oil leakage through the upper axial clearance or blocker ring end gap. This design incorporates the use of four to six separate members in order to accomplish side sealing. The four separate members are complicated to manufacture and to assemble into the piston groove, increasing the costs associated with the design. Additionally, this design does not have the means to gap seal the oil control ring completely. A potentially significant oil escape path bounded by the cylinder wall, the bottom outer surface of the blocker ring, and the top outer chamfer of the rail exists allowing oil to flow from the end gap of the rail along the top outer chamfer and through the end gap of the blocker ring.

The present invention is directed at overcoming the problems as set forth above.

DISCLOSURE OF THE INVENTION

In one aspect of the present invention, a piston and ring assembly is adapted for use in an internal combustion engine. The internal combustion engine has a cylinder block which defines a cylinder bore and a cylinder wall. A piston is mounted for reciprocating movement in the cylinder bore and has an annular groove which defines an inner wall, an upper surface, and a lower surface. A ring assembly is disposed within the groove and includes a first member and a second member. The first member has spaced ends which defines a gap. The second member is adjacent to and partially radially overlying the first member and has first and second mating stepped ends spaced to define a diagonal step gap. A spring means is disposed between the inner wall and the first member for biasing the first member at a specified tension. A means for providing a seal between the second member and the groove is included herein.

In another aspect of the present invention, a ring assembly has a first member and a second member. The first member has spaced ends which define a gap. The second member is adjacent to and partially radially overlying the first member and has first and second mating stepped ends spaced to define a diagonal step gap. A spring means is adjacent the first member for biasing the first member at a specified tension.

The present invention utilizes a ring assembly within a groove that provides both gap and side sealing. This is accomplished through the use of a diagonal step gap portion and a means for providing a seal between the second member and the groove. The present invention employs an efficient and simple method of sealing the ring assembly within the piston groove.

BRIEF DESCRIPTION OF THE DRAWINGS

FIG. 1 is a partial cross-sectional view of an internal combustion engine embodying the present invention;

FIG. 2 is a detail view of the area encircled by line 2—2;

FIG. 5 is an enlarged detail cross-sectional view of the ring assembly in a pre-assembled state according to a third embodiment of the present invention;

FIG. 6 is an enlarged perspective detail view of the radial stepped end gap of the present invention;

BEST MODE FOR CARRYING OUT THE INVENTION

Figure 3:
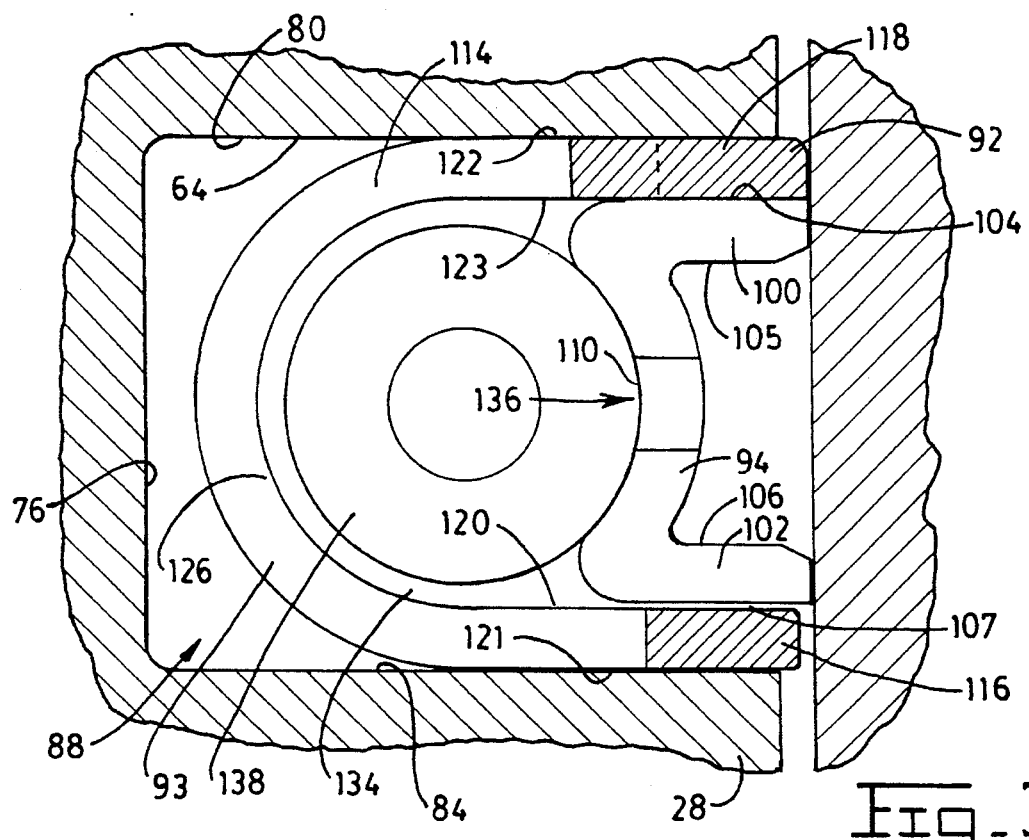
FIG. 3 is an enlarged detail cross-sectional view of a ring assembly according to a first embodiment of the present invention.

Referring now to the drawings and in particular to FIGS. 1 and 2, an internal combustion engine 10 includes a cylinder block 12 with an annular open ended bore 14 defined by an annular wall 15 at an upper end 16. A piston 28 is reciprocatively mounted within the bore 14 in a conventional manner. A cylinder head 42 is mounted at the upper end 16 of the cylinder block 12 in closing relation to the bore 14 adjacent the piston 28. A combustion chamber 50 is formed within the bore 14 between the cylinder head 42 and the piston 28.

The piston 28 has an upper annular groove 60 near the top thereof and a lower annular groove 64 farther from the top. The upper groove 60 may contain any suitable type of compression ring 68. The lower annular groove 64 has an inner wall 76, an upper surface 80, and a lower surface 84 and contains an oil control ring assembly 88 forming with the piston 28 a piston and ring assembly 90. The oil control ring assembly 88 includes a rail member 92 which is manufactured from any suitable material, preferably steel, and includes a plurality of intermittent slots 93 defined therein.

Figure 10:
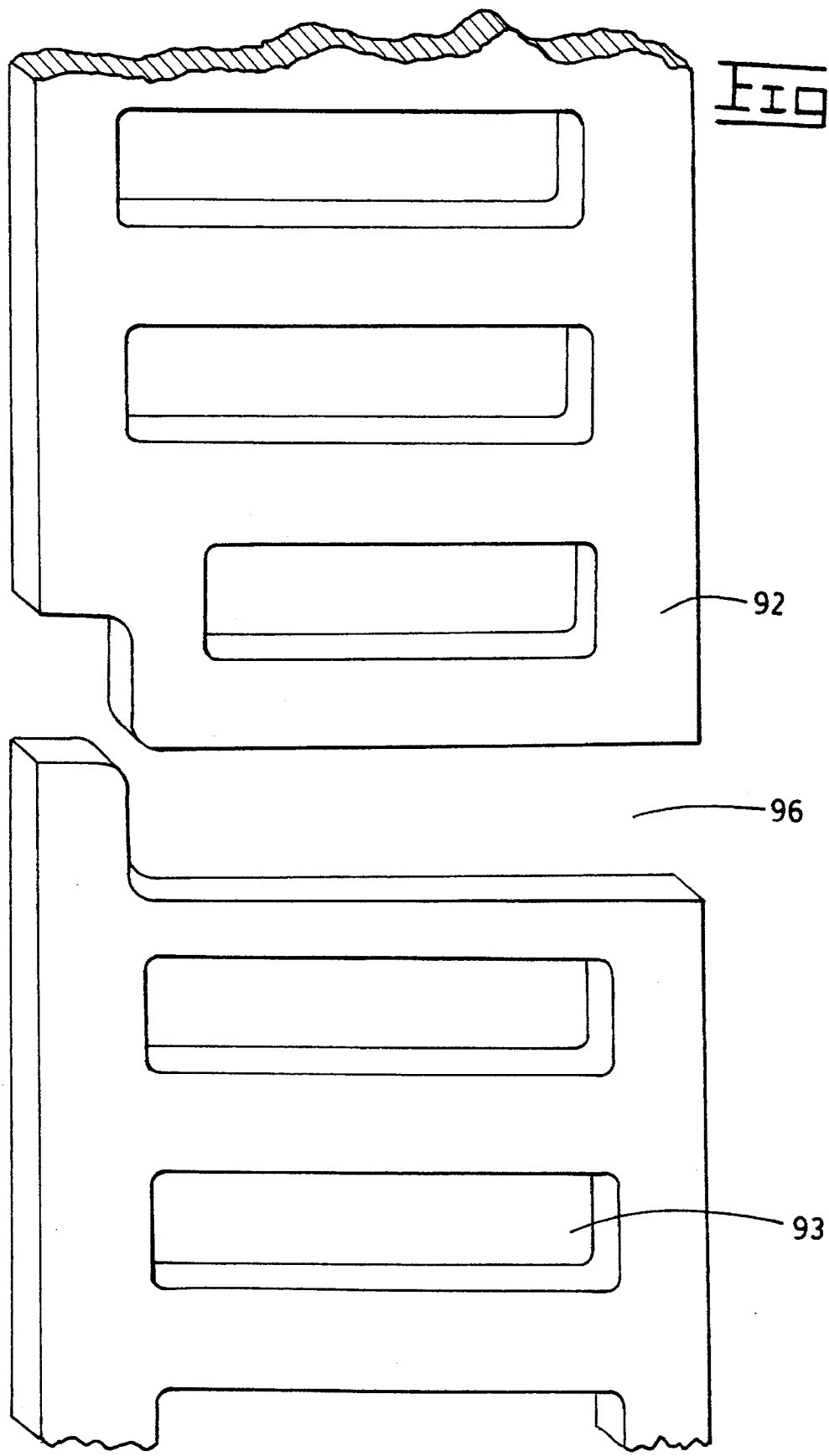
FIG. 10 is an enlarged perspective detail view of the intermittent slots of the embodiment of FIG. 3 of the present invention as they would appear at an earlier stage of the manufacturing process.

The enlarged sectional view of FIG. 3 illustrates one embodiment of the oil control ring assembly 88 according to the invention. The rail member 92 includes a double rail scraper ring 94 with an inside diameter larger than the outside diameter of the lower groove 64 before insertion therein. The scraper ring 94 has first and second rail end portions 100,102. The first and second rail end portions 100,102 each have substantially planar upper and lower surfaces 104,105,106,107, respectively, which blendingly curve inward to define an inner annular spring groove portion 110. The scraper ring 94 is split to define an end gap 96 as can be seen more clearly in FIG. 6. The rail member 92 also includes a U-shaped sealing ring component 114 which has first and second ends 116,118 each with substantially planar upper and lower surfaces 120,121,122,123, respectively, which integrally form an outer annular groove portion 126. The U-shaped sealing ring component 114 is split to define a radially stepped end gap 130 wherein the ends are reduced in radial width to produce an overlapping effect as can be seen more clearly in FIG. 6. The radially stepped end gap 130 has first and second step surfaces 131,132. The U-shaped sealing ring component 114 substantially circumferentially surrounds and radially overlies the scraper ring 94 to define an annular spring cavity 134 formed between the inner and outer groove portions 110, 126. The lower surface 121 of the first end 116 is connected only at the upper surface 104 of the first rail portion 100 by any suitable means, such as welding or any physical bonding process, in a manner that assures that the end gaps 96,130 are offset from each other. It should be noted that the weld or physical bonding process does not occur at the end gaps 96,130 of the scraper ring 94 and the U-shaped sealing ring component 114, respectively. A means 136, including a coil spring 138, is used to force the U-shaped sealing ring component 114 against the upper surface 80 of the groove 64 so that a seal may be developed therebetween. The coil spring 138 is disposed and partially engaged within the annular spring cavity 134. The coil spring 138 has a nominal spring rate of approximately 3.8 N/mm. The intermittent slots 93 are defined within the scraper ring 94 and the U-shaped sealing ring component 114 and form a ribbon-like design, which can be seen more clearly in FIG. 10. FIG. 10 illustrates component 114 to have the ribbon-like shape prior to being formed into a U-shape in the envisioned manufacturing process.

Other embodiments of the present invention are shown in FIGS. 4–5, 8, and 12–13. It should be noted that the same reference numerals of the first embodiment are used to designate similarly constructed counterpart elements of these embodiments. It should be understood that the principles and techniques for the first embodiment described can be applied to the other embodiments shown and to any variations thereof.

Figure 4:
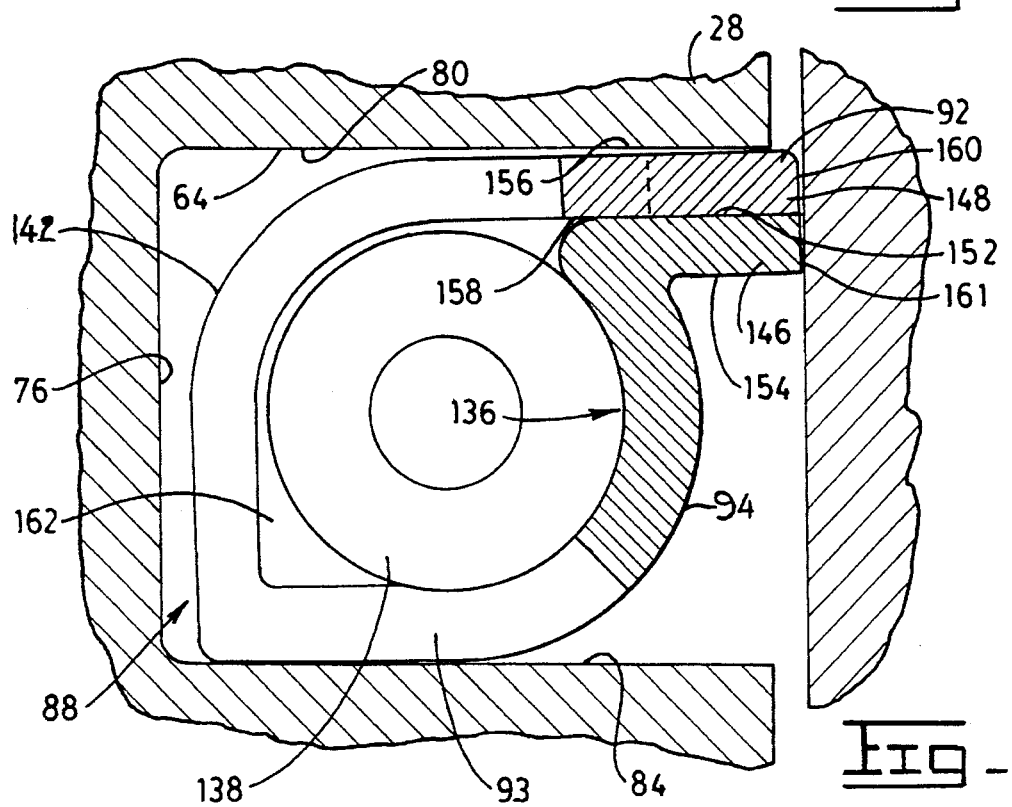
FIG. 4 is an enlarged detail cross-sectional view of the ring assembly according to a second embodiment of the present invention.
Figure 11:
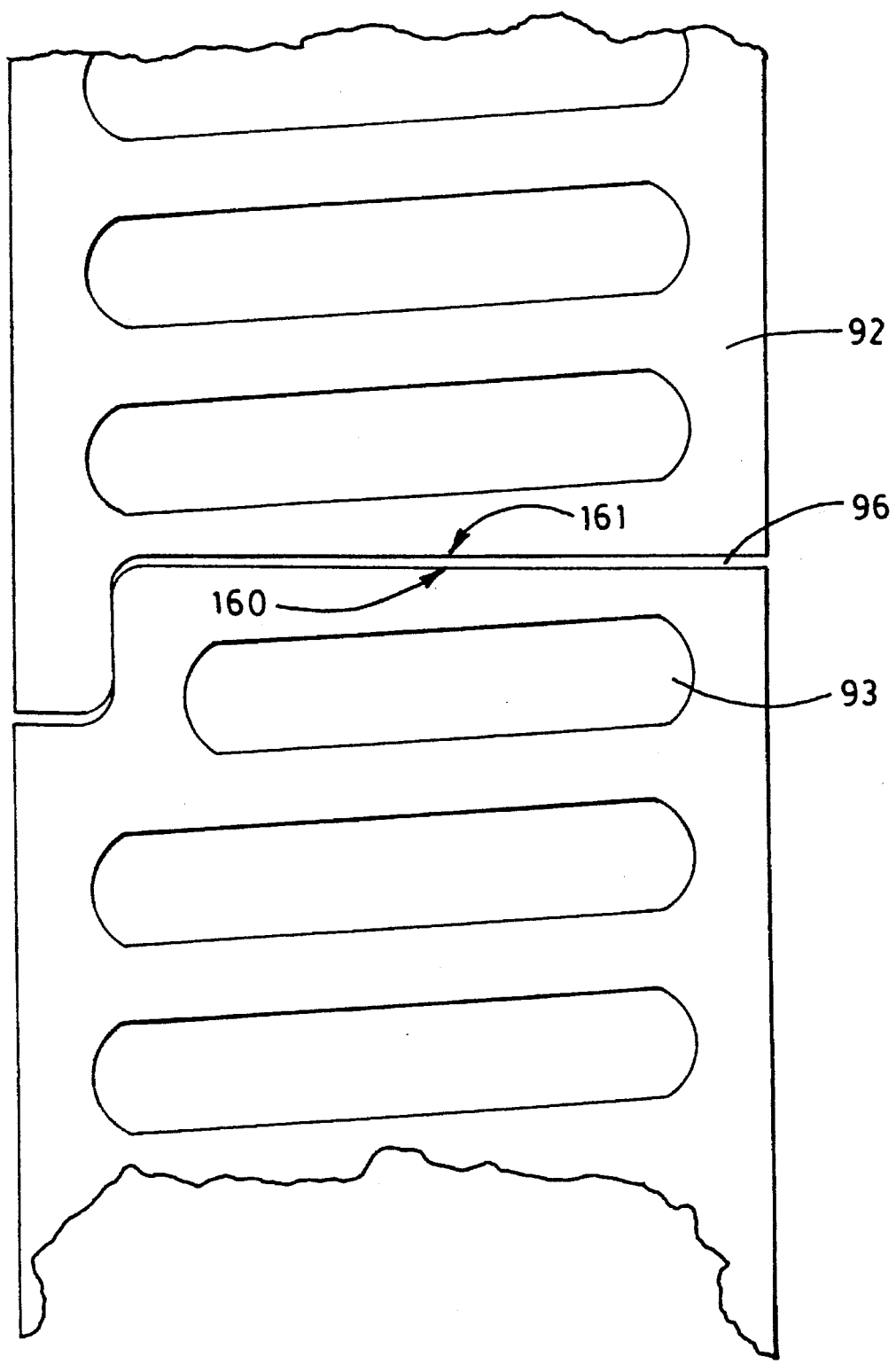
FIG. 11 is an enlarged perspective detail view of the intermittent slots of the embodiment of FIG. 4 of the present invention as they would appear at an earlier stage of the manufacturing process.

A second embodiment of the oil control ring assembly 88 is illustrated in FIG. 4. The rail member 92 is a single integrally formed component 142 including scraper and seal end portions 146,148 each with substantially planar upper and lower surfaces 152,154,156,158, respectively, terminating at respective ends 160,161. The upper surface 152 of the scraper portion 146 is connected to the lower surface 158 of the seal portion 148 by any suitable means, such as welding or physical bonding, in a manner that assures that the end gaps 96,130 (FIG. 6) are offset from each other. It should be noted that the weld or physical bonding process does not occur at the end gaps 96,130 of the scraper portion 146 and the seal portion 148, respectively. The scraper and seal portions 146,148 are connected so that a closed annular spring cavity 162 is formed therein. The coil spring 138 is disposed within the annular spring cavity 162. The forcing means 136 is developed by the spring force and its opposing force so that the seal portion 148 is forced against the upper surface 80 of the groove 64 establishing a seal therebetween. The intermittent slots 93 are similar to those described in the embodiment of FIG. 3, as can be seen more clearly in FIG. 11, with the rail member 92 having a ribbon-like shape at an earlier stage of manufacture prior to being formed into the shape shown in FIG. 4. However, the ends 160,161 which form the end gaps 96,130 in a later stage of manufacture are cut at an angle other than 90 degrees so that the gap ends for the lower scraper and upper seal portion 146,148 will be axially misaligned when the shape shown in FIG. 4 is obtained.

A third embodiment of the oil control ring assembly 88 is illustrated in FIG. 5. The rail member 92 includes a single rail portion 166 which has a cross-sectional hook shape with a projecting annular end 167. The projecting end 167 has an upper surface 168 and a lower surface 170. An annular spring cavity 174 is defined on an inner middle portion 178 of the rail portion 166 with the coil spring 138 disposed adjacent to and therein. The forcing means 136 is developed similar to the method described for FIG. 4 so that the step gap ring 180 is forced against the upper surface 80 of the groove 64 establishing a seal therebetween. The rail portion 166 is split so that the end gap 96 is formed thereon. The rail member 92 includes an annular step gap ring 180 which has an upper and lower annular surface 181,182 and is split so that the radial stepped end gap 130 is formed thereon. The gap ring 180 is connected to the upper surface 168 of the projecting end 167 by any suitable means, such as welding or physical bonding, in a manner that assures that the end gaps 96,130 are offset from each other. It should be noted that the weld or physical bonding process does not occur at the end gaps 96,130 of the rail portion 166 and the gap ring 180, respectively. The plurality of intermittent slots 93 are formed around a lower section 183 of the rail portion 166 to define a plurality of fingers 184 similar to those which can be seen more clearly in FIG. 9.

Figure 7:
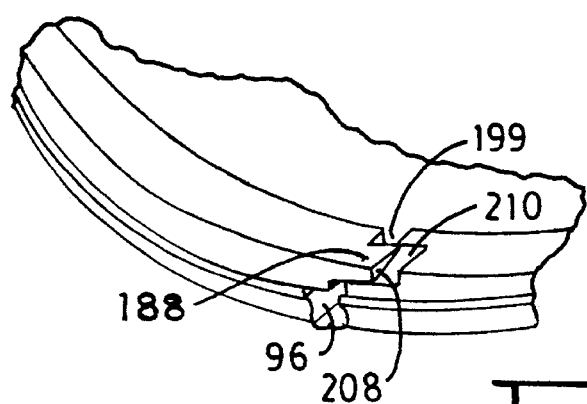
FIG. 7 is an enlarged perspective detail view of the diagonal stepped end gap of the present invention.
Figure 8:
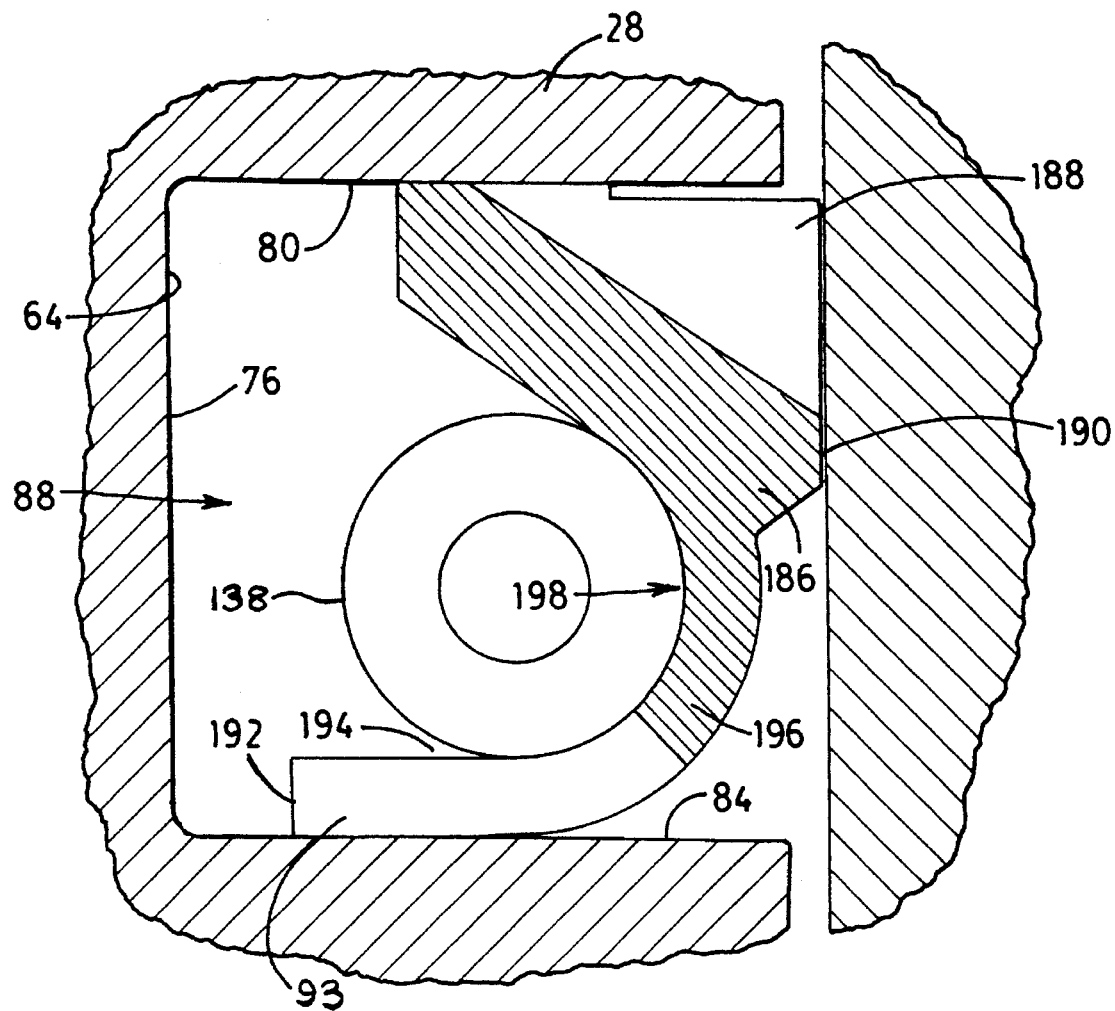
FIG. 8 is an enlarged detail cross-sectional view of the ring assembly according to a fourth embodiment of the present invention.

A fourth embodiment of the oil control ring assembly 88 is illustrated in FIG. 8. In this embodiment, a single rail portion 186 is integrally formed with a step gap portion 188 similar to that shown in FIG. 7. The single rail portion 186 has a cross-sectional hook shape with a projecting annular end 190 and a lower tail 192. An annular spring cavity 194 is defined on a middle section 196 of the single rail portion 186 with the coil spring 138 disposed adjacent to and therein. A means 198 is established for providing a seal between the step gap portion 188 and the upper surface 80 of the groove 64. The means 198 utilized may be the forcing means 136 similar to the method described in FIGS. 4 and 5. A diagonal step gap 199 is defined within the radial step gap portion 188 and the single rail portion 186. The plurality of intermittent slots 93 are defined around the lower tail 192 as can be seen more clearly in FIG. 9.

Figure 12:
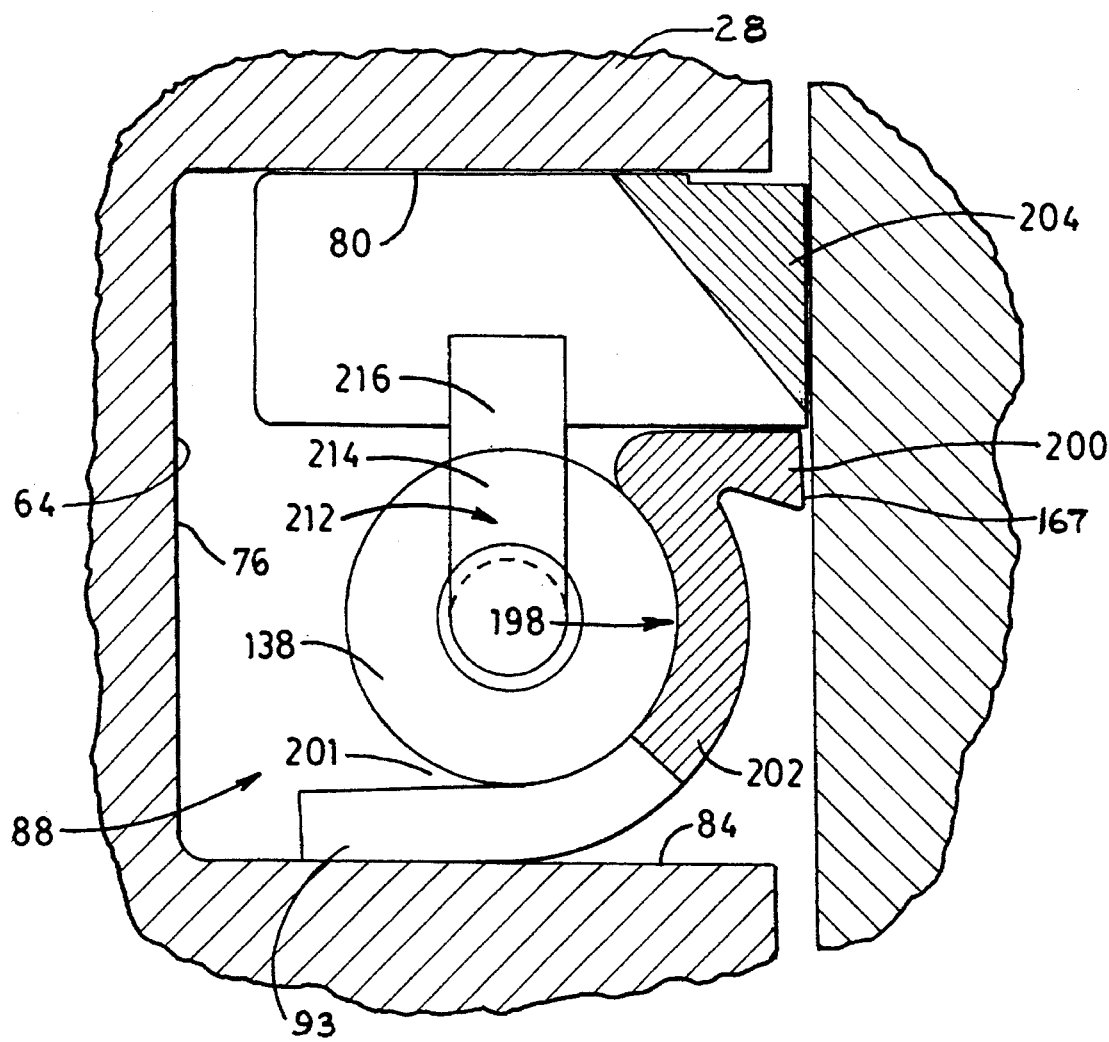
FIG. 12 is an enlarged detail cross-sectional view of the ring assembly according to a fifth embodiment of the present invention.

A fifth embodiment of the oil control ring assembly 88 is illustrated in FIG. 12. The ring assembly 88 has a first member 200 with a cross-sectional hook shape with the projecting annular end 167. An annular spring cavity 201 is defined on an inner middle portion 202 of the first member 198 with the coil spring 138 disposed adjacent to and therein. The providing means 198 is utilized similar to the method described in FIGS. 4–5 and 8 so that a seal is developed between the second member 204 and the upper surface 80 of the groove 64. The first member 200 is split to define the end gap 96. A second member 204 is split to define the diagonally stepped end gap 199. The second member 204 has ends 208,210 which are partially reduced in radial and axial width to produce an overlapping effect as can be seen more clearly in FIG. 7. The plurality of intermittent slots 93 are defined around the first member 200 similar to that described in the embodiment of FIG. 5. It should be understood that the first and second members 200,204 could be integrally formed and still define the diagonally stepped end gap 199 so that the end gap 96 could be eliminated without changing the scope of the invention. A means 212 may be provided for maintaining the misalignment between the end gap 96 and the diagonal step gap 199. The misalignment means 212 may include an alignment wire ring 214 which has an upset end 216 threadably attached to the coil spring 138. The upset end 216 of the alignment wire ring 214 is elongated to extend through a portion of the coil spring 138 and terminate within a portion of the diagonal step gap 199.

Figure 13:
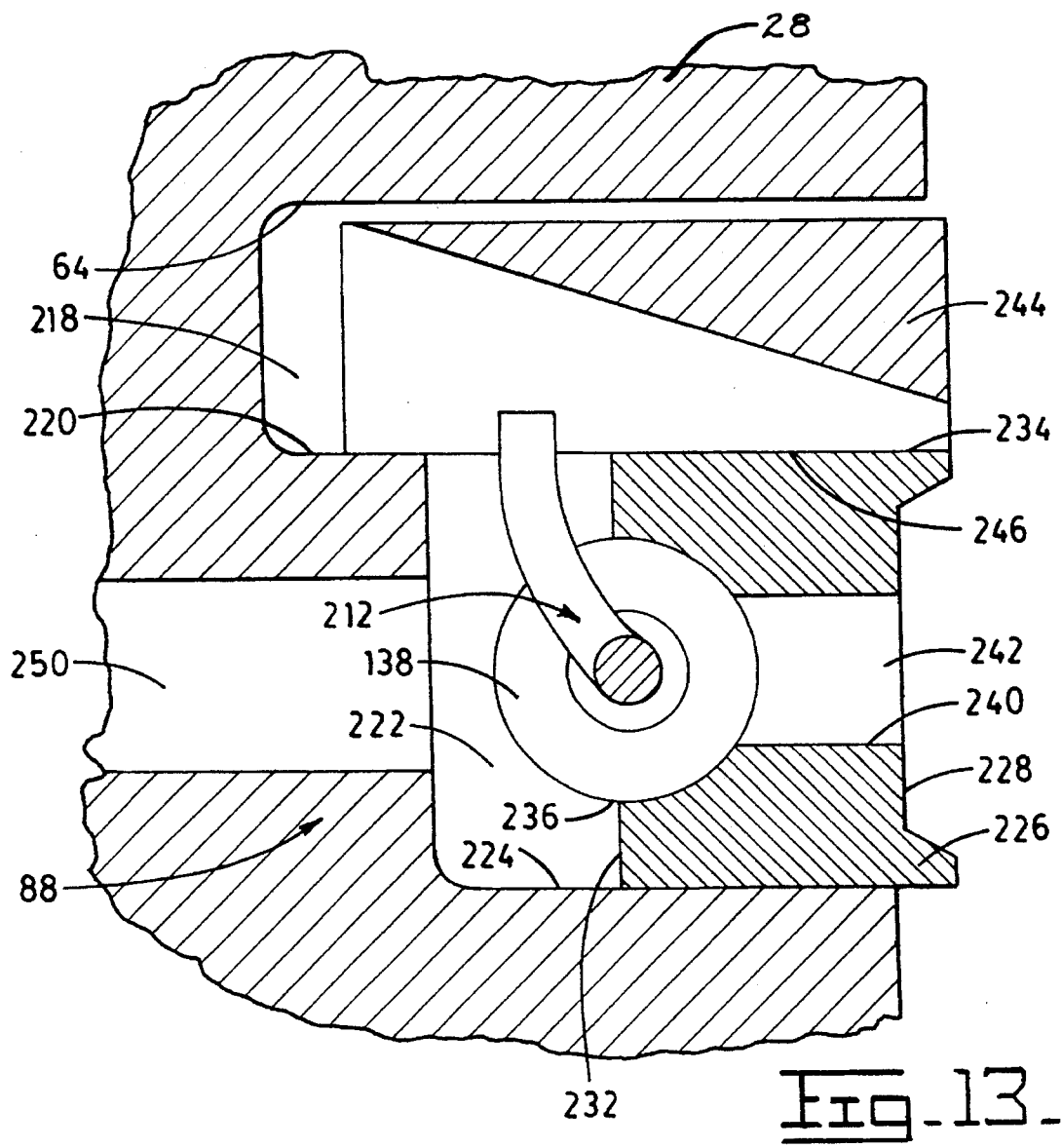
FIG. 13 is an enlarged detail cross-sectional view of the ring assembly according to a sixth embodiment of the present invention.

A sixth embodiment of the oil control ring assembly 88 is illustrated in FIG. 13. The lower groove 64 is stepped to include an upper portion 218 with a bottom wall defining an upper seat 220 and a lower portion 222 with a bottom wall defining a lower seat 224. The lower portion 222 has a radial depth less than the radial depth of the upper portion 218. The ring assembly 88 includes a double rail scraper ring member 226 with a front end portion 228 facing toward the cylinder block 12, a rear end portion 232 facing the lower groove 64, and an upper surface 234. The scraper ring 226 is seated against the lower seat 224 and defines an annular spring cavity 236 wherein the coil spring 138 is disposed. The providing means 198 is established so that a seal is developed between the step ring member 244 and the upper seat 220 of the groove 64 and the upper surface 234 of the scraper ring 226. The upper surface 234 of the scraper ring 226 is substantially co-planar with the surface of the upper seat 220. The scraper ring 226 is split to define the end gap 96. A bore 240 is defined within the scraper ring 226 which extends from the front end portion 228 to the rear end portion 232 so that a first passage 242 is created between the cylinder bore 14 and the lower groove 64. A step ring member 244 is split to define the diagonally stepped end gap 199 as can be seen more clearly in FIG. 7. The step ring member 244 has a lower region 246 which is seated against the upper seat 220 so that the step ring 244 is seated against and adjacent to the upper surface 234 of the scraper ring 226. The step ring member 244 may be seated against the upper seat 220 in a manner that allows the end gap 96 and the diagonal step gap 199 to be offset from each other. However, it should be noted that the offset is optional. A second passage 250 is defined within the piston 28 extending from the lower groove 64 and terminating within an inner drain cavity 254. The misalignment means 212 extends through a portion of the coil spring 138 and terminates within the upper portion 218 of the lower groove 64 adjacent a portion of the diagonal step gap 199.

INDUSTRIAL APPLICABILITY

In use on an internal combustion engine 10, the oil control ring assembly 88 provides both side and gap sealing. For purposes of clarification, side sealing refers to the ability to keep lubricating oil, located within the lower groove, from entering the combustion chamber around the upper surface of the oil control ring assembly 88. Gap sealing refers to the ability to keep lubricating oil located within the cylinder bore 14 from escaping through the end gap 96 and into the combustion chamber. This occurs especially when inertia forces tending to move oil toward the combustion chamber are high such as during the upper half of piston 28 travel toward and away from the point corresponding to minimum combustion chamber volume. Essentially all contemporary diesel engines utilize piston ring designs which include three or more rings. As implied in FIG. 2, it would be preferable to achieve acceptable gas and oil sealing with only two rings, a compression or gas sealing stepped top ring and an oil sealing scraper ring.

Referring more specifically to FIGS. 3, 6 and 10, the oil control ring assembly 88 is inserted within the lower groove 64 by compressing the first end 116 of the U-shaped component 114 toward the lower surface 107 of the second rail portion 102. The coil spring 138 is encased within the oil control ring assembly 88 so that assembly difficulties normally encountered with oil control springs may be virtually eliminated. Due to the compression fit within the lower groove 64, the oil control ring assembly 88 provides a substantial side seal at the top of the groove 64 while also piloting the oil control ring assembly 88 within the groove 64. Gap sealing is accomplished due to the relationship between the end gap 96 on the scraper ring 94 and the radial step gap 130 on the U-shaped component 114. Since the radial step gap 130 on the U-shaped component 114 is offset from the end gap 96 on the scraper ring 94, the lower surface 123 of the second end 118 blocks the flow of lubricating oil through the end gap 96. The first and second step surfaces 131,132 have virtually zero clearance therebetween forming a barrier which further blocks lubricating oil from entering the combustion chamber 50 through the step gap 130.

The piloting capability of the U-shaped component 114 allows the scraper ring 94 to be radially narrower and more conformable than contemporary designs. Contemporary designs must be radially wide enough to be partially engaged in the piston groove prior to compression for installation of the piston into the cylinder. The radially narrower scraper ring 94 minimizes sensitivity to bore distortion while still providing adequate scraping ability. Additionally, the intermittent slots 93 further enhance the conformability of the oil control ring assembly 88. It should be understood that in order to hold the proper sealing during operation, specific measurements for conformability and stiffness must be determined.

Referring more specifically to FIGS. 4–6 and 9–10, the oil control ring assembly 88 is conventionally inserted into the lower groove 64, such as through the use of a compression tool. In FIG. 4, the coil spring 138 with ends abutted so as to form a circle exerts a radial force outwardly from its center forcing the integrally formed component 136 against the wall of the cylinder bore 14. The radial force from the coil spring 138 is resisted by the wall of the cylinder bore 14 at the scraper portion 146 which is axially displaced from the point of application of the spring force (indicated by an arrow on FIG. 4), causing the oil control ring assembly 88 to twist within the groove 64. The seal portion 148 is forced against the upper surfaces 80 of the groove 64 and the opposite corner is forced against the lower surface 84 of the groove 64 by the twisting moment providing a side seal between the oil control ring assembly 88 and the upper surface 80 of the groove 64.

In FIG. 5, the coil spring 138 exerts a radial force outwardly from its center forcing the single rail portion 166 against the wall of the cylinder bore 14. The radial force from the coil spring 138 is resisted by the wall of the cylinder bore 14 at the projecting end 167 which is axially displaced from the point of application of the spring force (indicated by an arrow on FIG. 5), causing the oil control ring assembly 88 to twist within the groove 64. The step gap ring 180 is forced against the upper surface 80 of the groove 64 and the lower surface 170 of the rail portion 166 is forced against the lower surface 84 of the groove 64. The twisting moment provides a side seal between the oil control ring assembly 88 and the upper surface 84 of the groove 64.

The gap seal for the embodiments shown in FIGS. 4 and 5 is obtained similar to the embodiment of FIG. 3. The intermittent slots 93 provide a means to reduce torsional and radial stiffness which increases the ability of the oil control ring assembly 88 to conform, minimizing sensitivity to bore distortion.

Figure 9:
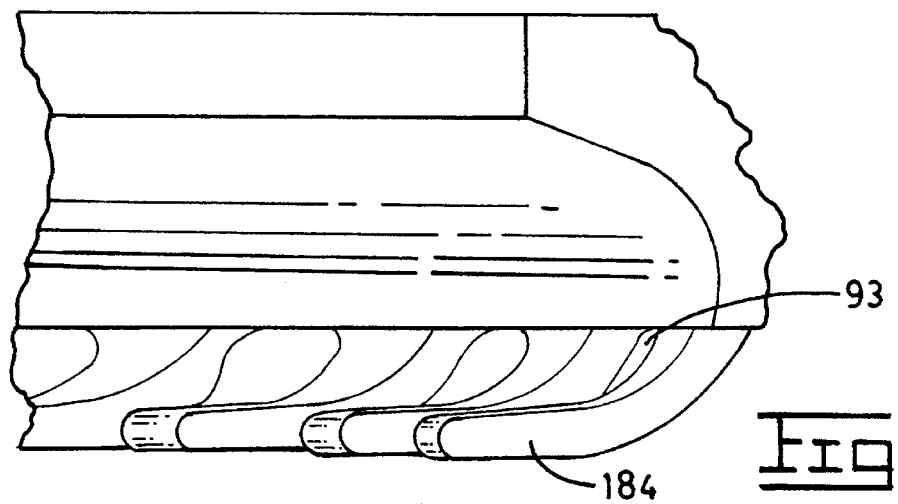
FIG. 9 is an enlarged perspective detail view of the embodiment of FIG. 8 showing the intermittent slots of the present invention.

Referring more specifically to FIGS. 8–9 and 12, the oil control ring assembly 88 is conventionally inserted into the lower groove 64, such as through the use of a compression tool. The side seal is obtained by the twisting moment similar to the embodiments in FIGS. 4 and 5. However, in FIG. 12, the second member 204 is forced against the upper surface 80 of the groove 64 and the lower surface of the first member 198 is forced against the lower surface 84 of the groove 64 to establish the side seal. The gap seal is obtained through the use of a diagonal step gap 199. The ends 208,210 of the diagonal step gap 199 have virtually zero clearance therebetween. Therefore, as lubricating oil passes through the end gap 96, the ends 208,210 form a barrier which blocks lubricating oil from entering the combustion chamber 50. The diagonal step gap 199 and the end gap 96 do not necessarily need to be offset from each other, as with the embodiments described above, since the clearance space within the diagonal step gap 199 is sufficiently limited to restrict the oil from entering. However, if the offset is utilized, the alignment wire ring 214 may be used to maintain the relative position between the first and second member 200,204, respectively. The alignment wire ring 214 extends through a portion of the step gap 199 and must not interfere with the clearance space. In FIG. 8, the side seal and the gap seal are achieved in the same manner as the embodiment shown in FIG. 12 except that both sealing features are embodied in a single component, whereas in FIG. 12, the gap sealing feature is embodied in a separate component.

Referring more specifically to FIG. 13, the double rail scraper ring member 226 and the step ring member 244 are inserted within the lower and upper portion 222,218, respectively, of the lower groove 64 in a conventional manner, such as by a compression tool. Whenever substantial gas pressure occurs above the step ring member 244, the ring 244 is seated against the upper seat 220 in the lower groove 64 so that a seal is developed therebetween. The gap seal is obtained through the use of a diagonal step gap 199 similar to the embodiment shown in FIG. 10.

It should be understood that excessive blowby can result under certain operating conditions in supercharged four cycle internal combustion engines even when a step gap top ring is utilized in an otherwise conventional two ring design. The potential for high blowby can be largely overcome by the side sealing bias forces which are part of the first five embodiments described herein. While the sixth embodiment shown in FIG. 13 does not include a built in side sealing bias force, it has the additional upper seat 220 in groove 64 which forms a seal with the upper ring 244 whenever substantial pressure occurs above the ring 244.

It should also be understood that to provide sufficient biasing force to maintain continuous side sealing at all operating conditions may be both impractical and unnecessary. For example, at high rotating speed and high load in supercharged engines, scraper rail friction, inertia forces, and gas pressure above the oil control ring assembly 88 would all be acting to unseat the ring assembly 88 from the top of the groove 64 during each revolution just as the piston 28 has passed bottom dead center and begins moving in the direction of minimum combustion chamber volume. A biasing force sufficient to hold the ring assembly 88 against the top of the groove 64 at this condition may create enough friction between the ring assembly 88 and the groove 64 to significantly alter the ring scraping force as the piston 28 moves laterally in the cylinder bore 14 in response to secondary dynamic forces. It should not be necessary to maintain a side seal in this range of piston travel since any oil present in the groove 64 would also be subject to a high inertia force plus a gas flow force in a direction away from the combustion chamber 50 and toward the crankcase. The biasing force, however, should be sufficient to maintain a side seal as the piston 28 approaches near the position corresponding to minimum combustion chamber volume when inertia would be urging oil to flow toward the combustion chamber 50.

In view of the above, it is apparent that the present invention provides a means to accomplish simultaneous gap and side sealing with an oil control ring assembly within a piston groove. The present invention utilizes a separate scraper and step gap portion. The step gap portion being either a radial or diagonal step gap. The radial step gap portion is misaligned from the scraper end gap to provide gap sealing while the diagonal step gap provides gap sealing without misalignment. Side sealing is accomplished by establishing a forced seal between the oil control ring assembly and the piston groove.

We claim:

1. A piston and ring assembly adapted for use in an internal combustion engine having a cylinder block defining a cylinder bore and a cylinder wall, comprising:

a piston mounted for reciprocating movement in the cylinder bore and having an annular groove defining an inner wall, an upper surface, and a lower surface;

a ring assembly disposed within the groove and including a scraping ring, a sealing ring, and a spring disposed between the inner wall and the scraping ring said scraping ring having spaced ends defining a gap and said sealing ring being adjacent to and partially radially overlying the scraping ring, said sealing ring having first and second spaced apart stepped ends, said first and second stepped ends being matingly disposed relative to each other and spaced to define a radially oriented step gap therebetween, said step gap being circumferentially offset from the gap on the scraping ring and including means for maintaining the misalignment between the step gap and the gap on the scraping ring, said maintaining means including an alignment wire disposed within the spring and extending therethrough toward the second member and terminating within the step gap;

said spring biasing the scraping ring at a specified tension; and means for providing a seal between the sealing ring and the groove.

2. A ring assembly, comprising:

a scraping ring having spaced ends defining a gap and a sealing ring being adjacent to and partially radially overlying the scraping ring, said sealing ring having first and second spaced radially oriented stepped ends, said stepped ends being matingly disposed relative to each other and spaced to define a step gap therebetween, said step gap being circumferentially offset from the gap on the scraping ring;

spring means adjacent the scraping ring for biasing the scraping ring at a specified tension; and means for maintaining the misalignment between the step gap and the gap on the scraping ring, said maintaining means including an alignment wire disposed within the spring means and extending upwardly toward the sealing ring and terminating within the step gap.

* * * * *